United States Patent

[11] 3,617,143

| [72] | Inventor | Harold K. McKee |
| | | Chalfont, Pa. |
| [21] | Appl. No. | 820,212 |
| [22] | Filed | Apr. 29, 1969 |
| [45] | Patented | Nov. 2, 1971 |
| [73] | Assignee | Custom Alloy Corporation |
| | | Califon, N.J. |

[54] ARCUATE HOLE-CUTTING TOOL
1 Claim, 4 Drawing Figs.

[52] U.S. Cl. ................................................ 408/127,
64/7, 175/75
[51] Int. Cl. ....................................... B23b 41/00
[50] Field of Search ............................................ 77/15;
144/106; 145/69; 64/2, 2–6, 7; 175/61, 75

[56] References Cited
UNITED STATES PATENTS
| 2,669,429 | 2/1954 | Zublin .......................... | 175/75 X |
| 447,389 | 3/1891 | Wentworth .................... | 77/15 X |
| 550,783 | 12/1895 | Elliott et al. .................. | 77/15 X |
| 944,228 | 12/1909 | Bambridge .................... | 64/2–6 |
| 1,021,924 | 4/1912 | Fetzer ............................ | 64/7 |
| 2,960,892 | 11/1960 | Sprauka ......................... | 77/15 |

*Primary Examiner*—Francis S. Husar
*Attorney*—Paul & Paul

ABSTRACT: A cutting tool for cutting along an annular path comprises a cutting head, a drive motor and speed reducer unit including an output shaft, and a fixed-angle rotating joint transmission means mounted in an arcuate member and connected to one end to the output shaft and at the other end to the cutting head for transmitting power thereto about a severe arc. The tool and power source are mounted on a rotatable table so that the tool can be fed into a stationary workpiece.

INVENTOR.
Harold K. McKee
BY
Paul & Paul
ATTORNEYS.

INVENTOR.
Harold K. McKee
BY
Paul + Paul
ATTORNEYS.

ARCUATE HOLE-CUTTING TOOL

BACKGROUND OF THE INVENTION

This invention relates to cutting tools and more particularly to a cutting tool for making cuts along severe arcs through solid metal workpieces.

In the art of the making tubing (that is tubing having an internal diameter of over 3 inches) which is formed to follow an arc of, say, 90°, it is customary to place a straight piece of tubing on a mandrel and then form it by bending it. Depending on the type of material used and the wall thickness desired, a number of problems arise by the use of such a method. For one thing the wall thickness varies and cannot be held uniform throughout, and for another brittle materials cannot be subjected to such bending without developing cracks.

SUMMARY OF THE INVENTION

I have overcome the deficiencies in the prior art by the invention of a new and useful took for cutting along an arcuate path through a solid piece of material. By use of this invention, it is possible to bore a round through hole in a solid curved piece of material along an arcuate path so as to form a finished piece of curved tubing having accurately machined internal dimensions and a substantially uniform wall thickness. The machine comprises a power input means including a drive shaft extending therefrom, a cutter head, and a power transmission means including an arcuate housing and a plurality of fixed-angle flexible joint transmission members connected to the power shaft and the cutting head. In the preferred embodiment of my invention the entire tool is mounted on a rotatable table so as to be fed through a fixed workpiece.

Accordingly, it is an object of my invention to provide a new and useful tool for cutting through solid material on an arcuate path, said tool being stable and capable of holding accurate dimensions.

This and other objects of my invention will become apparent form the following description with reference to the accompanying drawings.

A BRIEF DESCRIPTION OF THE DRAWINGS

DESCRIPTION OF THE PREFERRED EMBODIMENTS

Figure 1:
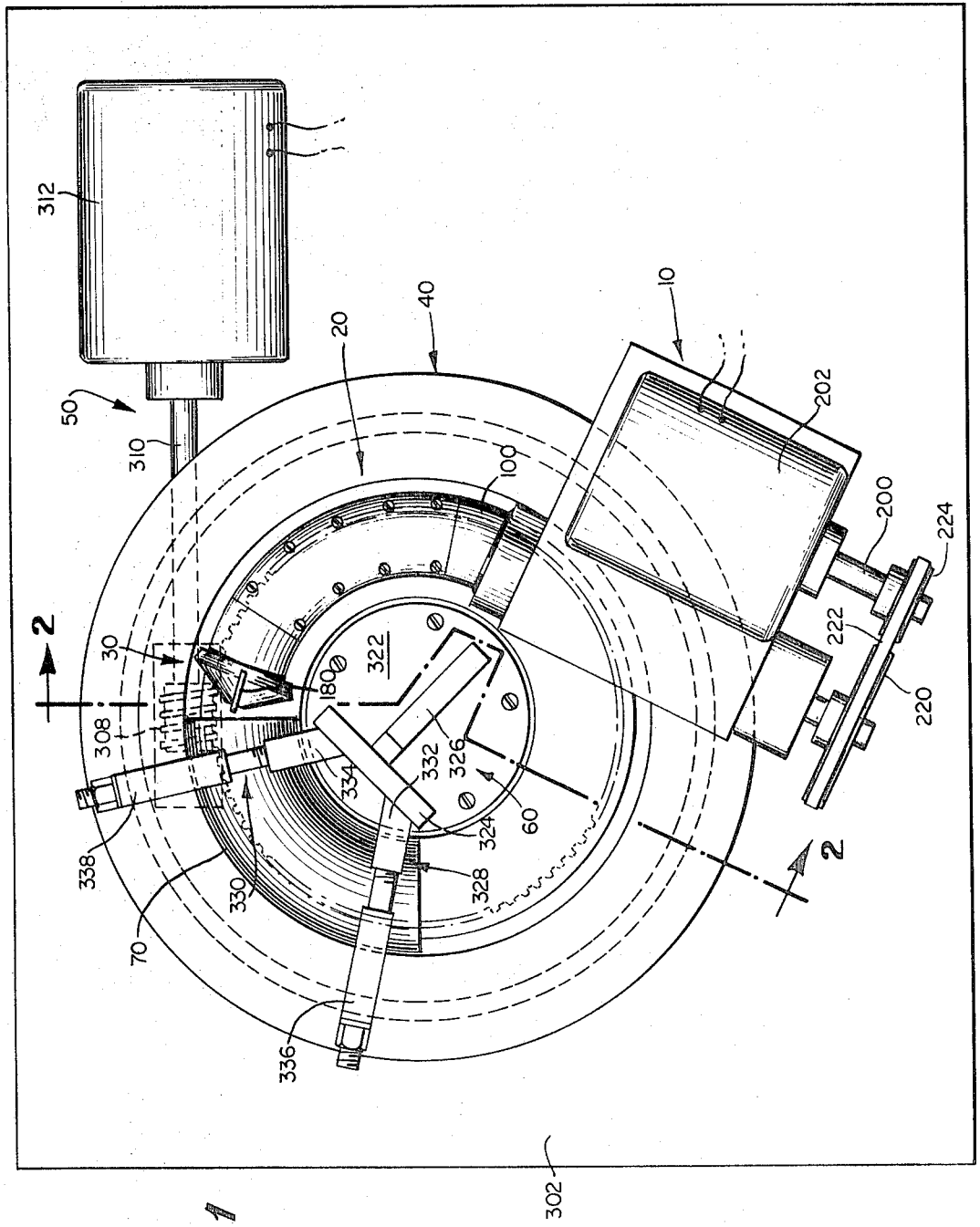
FIG. 1 is a plan view of the apparatus in accordance with the preferred embodiment of my invention, showing a workpiece mounted in operative relation thereto.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 shows a plan view of an apparatus in accordance with the preferred embodiment of this invention which includes a power source or input means designated generally 10, a power transmission means designated generally 20, and a cutting head designated generally 30. The remainder of the apparatus consists of a rotatable annular table designated generally 40 upon which the power input means is mounted, a means for rotating the table designated generally 50, and means fixed to the hub in the center of the table designated generally 60 for holding the workpiece 70 in a fixed position while the table rotates.

Figure 2:
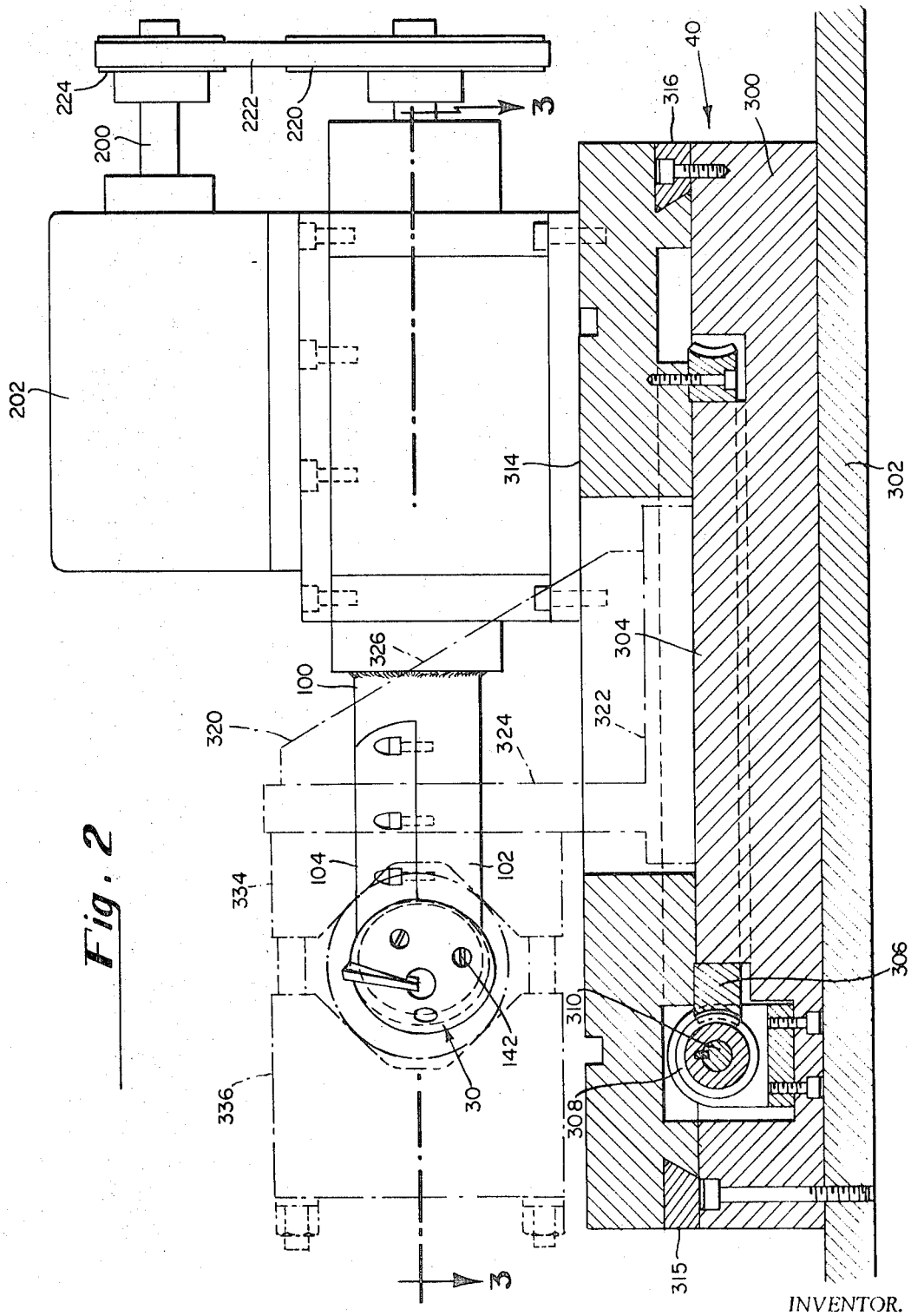
FIG. 2 is a view taken as indicated by the lines and arrows 2—2 in FIG. 1, with the workpiece and its associated mounting frame shown in phantom.
Figures 3, 4:
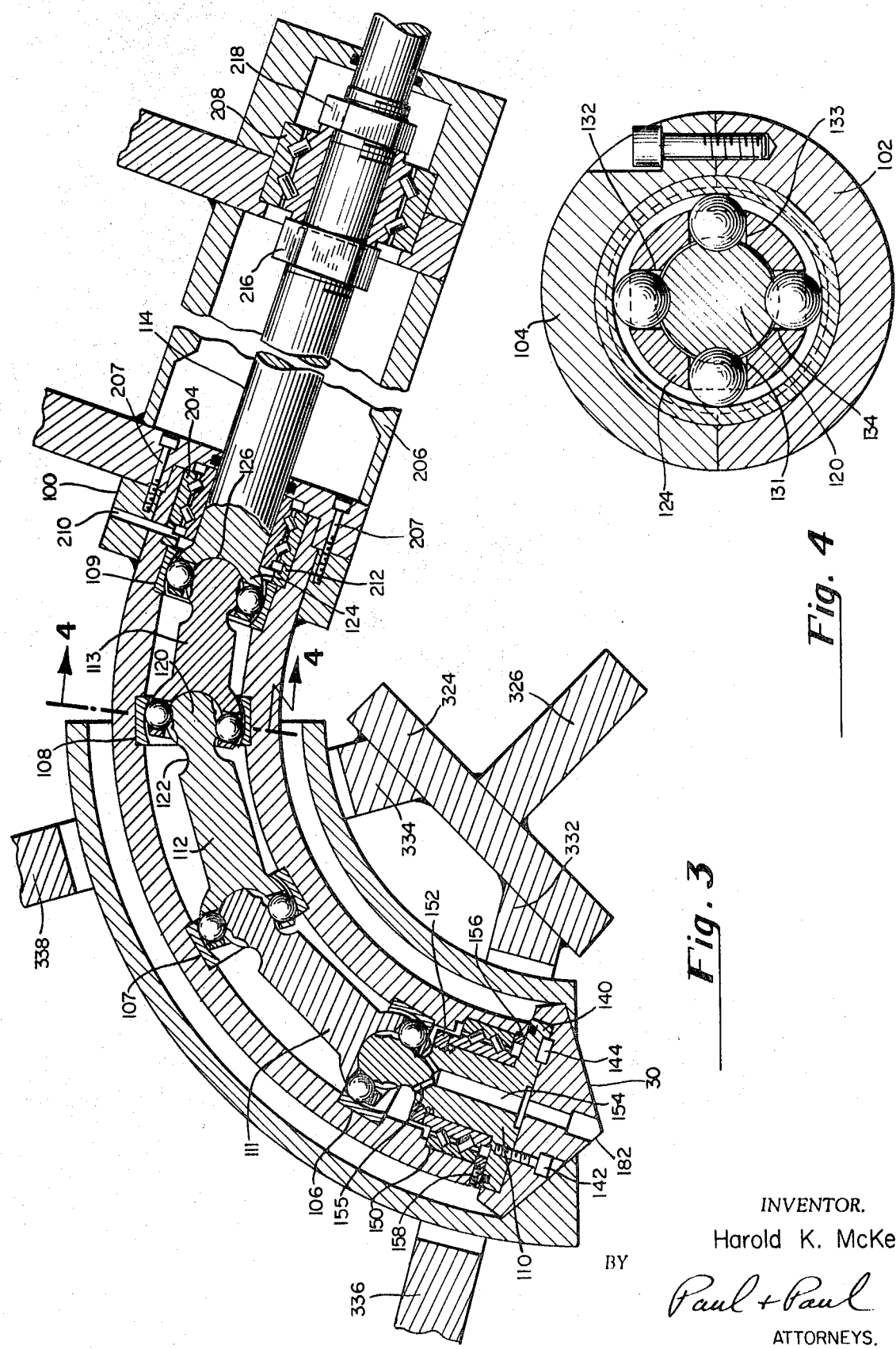
FIG. 3 is a section taken as indicated by the lines and arrows 3—3 in FIG. 2.
FIG. 4 is a section taken as indicated by the lines and arrows 4-4 in FIG. 3.

The power transmission means is shown in more detail in FIGS. 3 and 4. It comprises a body 100 including a base portion 102 and a cap portion 104. Both the cap and base portions are arcuate steel members accurately machined inside and out. The cap is retained on the base 102 by means of machine screws shown more clearly in FIGS. 2 and 4, to form a tube with a round internal bore. Within this tube, seats have been cut for bearing races 106, 107, 108, 109 at spaced intervals. The bearing races can be standard outer races from ball bearing such as SKE bearings number 2304. It has been found that these races provide an excellent means for retaining the fixed-angle joints to be described more fully hereinafter.

In order to transmit power from the power shaft to the cutter head I have developed a transmission means including a fixed-angle rotatable transmission joint. In accordance with the preferred embodiment of my invention this means consist of a plurality of links or spindles 110, 111, 112, 113, 114 each having a shaft portion and a fixed-angle joint portion at one or both ends. Each joint includes a male and female portion. The male portion consist of a spherical knob, as at 120, having inner races therein said races preferably being four in number and diametrically spaced from one another at equal angles. Each of said inner races, is cut in the form of a lemniscate. The spherical knob is connected to the shaft by a neck portion which is relieved, as at 122, to clear the female portion. The female portion consist of a hollow spherical yoke 124 which has had the terminal portion thereof removed and has an axial bore therein terminating in a semispherical blind end 126 for reception of the male end in spaced relation thereto. Communicating with the axial bore is a plurality of bores passing through the wall of the female member. There are four diametrically opposed equally spaced transverse bores, as at 130, 131, 132, 133, through the walls, the axes of which intersect the center of the semispherical blind end. Within each of these transverse bores a steel ball is disposed in sliding engagement therewith and in contact with and bearing against the lemniscates on the male member and the outer race of the bearing. Thus bearing means is formed for both supporting the power transmission links and for transmitting power from the power input shaft to the cutter head. The steel balls are similar to those used in ball bearings and are accurately ground, highly polished steel.

The link 110 most remote from the source of power differs from those previously described in that the female end is replaced by an end for mounting the cutter head 30. As shown in FIG. 3 this end comprises an annular flange portion 140 transverse to the axis of the link. The flange has a plurality of threaded holes therein for receiving machine screws 142 which pass through the face of the cutter head and securely clamp the cutter head to the flange. In addition the face of the flange has been milled out so as to provide slots for keys 144 which are received in a press fit therein and are designed to be accepted in mating keyways on the inner face of the cutter head. These keys provide a positive means for locating the cutter head with respect of the flanged portion and for supplying a suitable means for transferring power thereto.

The cutter head most preferably is recessed to accept substantially the entire flange 140. The inner edge of the flange is provided with an annular groove for receiving a seal, such as an O-ring, an order to provide an effective seal between the flange and the body of the transmission member. The shaft 110 of the transmission link is mounted in dual thrust bearings 150 which are held against the flange by a suitable retaining ring 152 threaded over the male end thereof. An axial bore 154 proceeds from the flange end toward a blind hole in the male end. Communicating with the blind end are a plurality of tangential feeder holes 155 which provide conduit means for oil under pressure which is supplied through this link to the cutter head. The outer race of the thrust bearings is likewise held in position by a clamp ring 156 which is threaded on to the body and holds the outer race against the shoulders as shown. A setscrew 158 is provided in the body to hold the clamp ring in position.

The cutter head consists of one or more blades or cutting bits 180 FIG. 1 on an elliptical surface so that the head cuts in an ellipse and as it is moving in the arcuate path thereby cutting a circular hole through the workpiece. The cutter head has one or more holes 182 which open onto an area of the face close to the apex of the sloping cutter, so that oil driven under pressure through the conduits and transmission means will flow across the face back towards the periphery and thereby wash the cut chips from the cutting surface while at the same time lubricating the cutting tools. The cut chips in turn flow back along the outside of the body of the transmissions means and are disgorged through the hole being made by the cutting tool.

The first link in the transmission chain is an extended shaft 114 which takes it power by means of a belt drive from the power output shaft 200 FIG. 1 of the motor 202. The shaft 114 has a female end mounted in thrust bearings 204 in the body 100, and the body 100 is connected to a housing 204 which has mounted therein another set of thrust bearings 208 supporting the other end of the shaft 114. A tap hole 210 is provided through the body 100 and passes through the bearing-retaining ring 212 which retains the thrust bearings in positioning against the shoulder of the housing 206; which housing is fastened by means of screws 207 to the body 100. The hole 210 is connected to a source (not shown) of high-pressure oil which is pumped through the body and which exists through the cutting head as previously described. Suitable seals are provided as illustrated by the O-rings about the shaft to prevent the oil from escaping along the shaft. The shaft is axially aligned and retained on the thrust bearing by means of collars 216, 218 which are in threaded engagement therein. At the outward end of the shaft 114 a pulley 220 is keyed for rotation and a belt 222 is provided which engages a pulley 224 on the end of power output shaft 200 of the motor. The motor can be an electrically reversible motor, or can be connected through means of a double clutch gearbox (not shown) in order to provide a reversible gear reduced prime mover to reverse the cutter head and withdraw it at a much faster speed than is used for cutting.

Referring to the FIGS. 1 and 2 illustrating the table 40, it comprises a base 300 mounted on an overall support frame 302 and having an annular groove therein forming in the center section a large cylindrical bearing 304. Journaled on the bearing is a ring gear 306 which is engaged by a worm gear 308 mounted for rotation to the end of a shaft 310 which is driven by an independently mounter motor 312. The shaft is supported in suitable bearings (not shown) in the base 300. The motor is an electric reduced-speed motor so that the table turns very slowly. Of course the speed can be varied by varying the pitch of the teeth on the worm and ring gears. The ring gear is securely fastened to the annular table top 314 so that rotation of the ring gear causes rotation of the top. The annular table top 314 is held by a plurality of jib segments 315, 316 which, as shown, are arcuate rims having an inner face which tapers outwardly and downwardly forming, in effect, a dovetail with the downwardly and outwardly extending portion of the table top. The jibs are attached in any suitable fashion as by means of screws passing downwardly into the base.

To provide a suitable means for mounting the workpiece, an upwardly extending frame 320 is mounted to the base 300 by means of a plurality of machine screws (shown in FIG. 1). The frame consists of a base 322, an upright member 324 and a web 326 which are all welded together at right angles. Extending at an angle of less than 90' one another, are a plurality of clamps 328, 330. Each clamp consists of an upright portion 332, 334 respectively, welded to member 324 and having beveled jaws shown more clearly in FIG. 2. Extending from each side of the beveled jaws is a threaded stud. The studs pass through clearance holes in a adjustable portion 336, 338 respectively which has beveled jaws presented in a mirror image to the jaws of the upright base portion, so as to form a chuck. The chuck is drawn together by means of the nuts which are threaded on the ends of the studs. When the workpiece is inserted into the chuck and the nuts are tightened, the workpiece will be firmly engaged.

By this apparatus, I have provided a new means for boring along an arcuate path through solid metal members made of such metals as stainless steel, in large diameters of 3 inches or more. To my knowledge there is no workable device for performing such a task. It must be appreciated that the device shown will bore an accurate arc and produce at the same time a good finished surface. It must also be appreciated that the device requires no pilot holes in order to guide the cutting head through the work. Rather the head will guide itself through the work.

Various changes in the configuration parts and materials described herein for purposes of illustrating this invention may be made by those skilled in the art within the scope of the following claims. For instance, while the invention has been described in terms of cutting a hole through a 90° arcuate section to form a tube, and accordingly the cutting head and transmission means would have to exceed the length of a 90° arc, larger arcs could be turned if a larger transmission arm were provided. This might require more transmission links and more transmission joints and of course these would be covered within the scope of my invention. If a longer transmission means were used and it became necessary to support the cantilevered end, it would be a simple matter to provide an annular support with bearing to guide the outer surface of the transmission arm before it entered the workpiece.

It will further be understood that the "Abstract of the Disclosure" set forth above is intended to provide a nonlegal technical statement of the contents of the disclosure in compliance with the rules of practice of the U.S. Patent Office, and is not intended to limit the scope of the invention described and claimed herein.

What is claimed is:

1. An apparatus for cutting an arcuate hole through a workpiece comprising:
   a. a source of motive power including a driven output shaft;
   b. a cutting head;
   c. a rigid arcuate hollow body having a transmission means mounted therein connected at one end to said output shaft and at the other end to said cutting head for transmitting power thereto abut the fixed arc of said body, said transmission means comprising a plurality of rigid shafts interconnected with one another and mounted at fixed angles with respect to said arcuate body, each of said shafts being mounted to rotate about its fixed longitudinal axis;
   d. means for holding a workpiece comprising a multiple-jaw chuck for gripping said workpiece at a plurality of positions along the length thereof, each of the jaws of said chuck being disposed at an angle to the others; and
   e. means for driving said cutting tool comprising a rotatable annular table upon which said source of motive power is mounted, said rigid arcuate body extending from said source of power in a plane parallel to said table, said multiple-jaw chuck being positioned to hold said workpiece in the path of said cutting tool as said table rotates, and means connected to said annular table to rotate said table about its center and drive said cutting tool through said workpiece.

* * * * *